June 17, 1969 M. T. DORRIS 3,449,969
MAGNETICALLY SYNCHRONIZED VIBRATOR APPARATUS
Filed Feb. 16, 1967 Sheet 1 of 5

INVENTOR.
MAURICE THOMAS DORRIS
BY
Bacon & Thomas
ATTORNEYS

June 17, 1969

M. T. DORRIS 3,449,969

MAGNETICALLY SYNCHRONIZED VIBRATOR APPARATUS

Filed Feb. 16, 1967

INVENTOR.
MAURICE THOMAS DORRIS
BY Bacon & Thomas

ATTORNEYS

INVENTOR.
MAURICE THOMAS DORRIS
BY
Bacon & Thomas
ATTORNEYS

United States Patent Office 3,449,969
Patented June 17, 1969

3,449,969
MAGNETICALLY SYNCHRONIZED VIBRATOR APPARATUS
Maurice Thomas Dorris, 19702 Matsonia Ave., Huntington Beach, Calif. 92646
Filed Feb. 16, 1967, Ser. No. 616,639
Int. Cl. F16h *33/00*
U.S. Cl. 74—61                                      17 Claims

ABSTRACT OF THE DISCLOSURE

Two independently driven rotary members provided with at least one permanent magnet, or electromagnet, to synchronize their rotation; each rotary member having means in the form of the mass of the magnet and/or some other mass associated therewith, to provide eccentric masses which, when rotated in opposite directions, will impart a vertical vibrating force to any desired structure. The rotary members are directly or indirectly, independently driven by an electric motor, either (or both) of which includes a variable resistor in the current supply line for adjusting the speed of the motors so that both rotary members rotate at as nearly the same speed as possible, whereupon the magnets will compensate for any slight out-of-phase rotation and maintain the rotary members synchronized. One of the rotary members may have a plurality of electromagnets mounted thereon, any one of which may be separately energized and cooperate with a magnet on the other rotary member to vary the direction of the vibrating force. In lieu of an electric motor drive, the rotary members can be designed as turbine elements and driven by adjustable jets of compressed air, etc.

BACKGROUND OF THE INVENTION

Field of the invention

The present invention relates to vibrator devices for creating and imparting vibratory movement to various other devices.

There are many uses for devices capable of producing or generating vibrations. For example, such devices are frequently associated with a table or form structure utilized in molding concrete products to vibrate the form to settle and compact a concrete mixture poured therein. Equipment incorporating vibrator means can also be utilized to compact dirt during construction operations, to drive pilings, to break up concrete, and for many other applications.

Description of the prior art

A common type of vibrator device employs a pair of oppositely rotating, eccentrically-weighted members to generate or produce vibrations. If the eccentric weight portions of said members are properly disposed relative to each other, then vibrations in a given direction can be produced when power is applied to simultaneously rotate the members. For example, if the eccentric weights on a pair of members mounted for rotation about a horizontal axis are disposed so that both will reach 6 o'clock and 12 o'clock positions simultaneously as the members are rotated in opposite directions at the same speed, then up and down vibrations in a vertical direction will be produced. Similarly, horizontal vibrations will be produced if the eccentric weights simultaneously reach the 3 o'clock and 9 o'clock positions. The frequency of vibrations can be varied by altering the speed of rotation of the members, and different directions of vibration can be obtained by changing the relative angular positions of the eccentrically-weighted members.

For such prior apparatus to continuously generate vibrations in a selected direction, it is absolutely necessary that the rotating members be synchronized and that the eccentric weights thereon be positively held in a fixed relative angular relationship. Thus, prior vibrator devices have had their rotating members interconnected by gears, chains and equivalent mechanical elements to positively cause the rotating means and the shafts on which they are mounted, to rotate at exactly the same speed and in predetermined angular relationship. These mechanical arrangements for synchronizing the oppositely rotating members add unnecessary bulk, increased cost, expensive maintenance and generate frictional heat in their operation, especially when the members are rotated at very high rates to produce high frequency vibrations.

SUMMARY OF THE INVENTION

This invention relates generally to vibrator devices of the type utilizing a pair of oppositely rotating, independently driven eccentrically-weighted members to generate vibrations in a given direction, and more particularly to novel vibrator devices embodying strong permanent magnets or electromagnets for synchronizing the opposite rotating members to hold them in the desired angular relationship during rotation thereof. The invention further contemplates a form of vibrator wherein the direction of vibration can be changed at will, and while the vibrator is in operation. The invention still further contemplates driving the rotating members by an adjustable electric or turbine type prime mover.

Accordingly, the principal object of the present invention is to provide apparatus for magnetically synchronizing the oppositely rotating, eccentrically-weighted members of a vibrator device, and to hold said members in a selected relative relationship during operation of the vibrator, without the use of any physical linking or driving elements therebetween.

Another object is to provide a magnetically synchronized vibrator apparatus, capable of operation at very high speeds to produce high frequency vibrations.

A further object is to provide a vibrator apparatus utilizing a pair of eccentrically-weighted, rotatably mounted members designed to be driven in the manner of a turbine to produce high frequency vibrations.

Still another object is to provide electromagnetic apparatus for synchronizing a pair of rotating members, operable to hold said members in any selected one of a plurality of relative positions.

Other objects and many of the attendant advantages of the present invention will be readily apparent from the following detailed description, when taken in conjunction with the accompanying drawings, wherein:

Description of preferred embodiments

Figure 1:
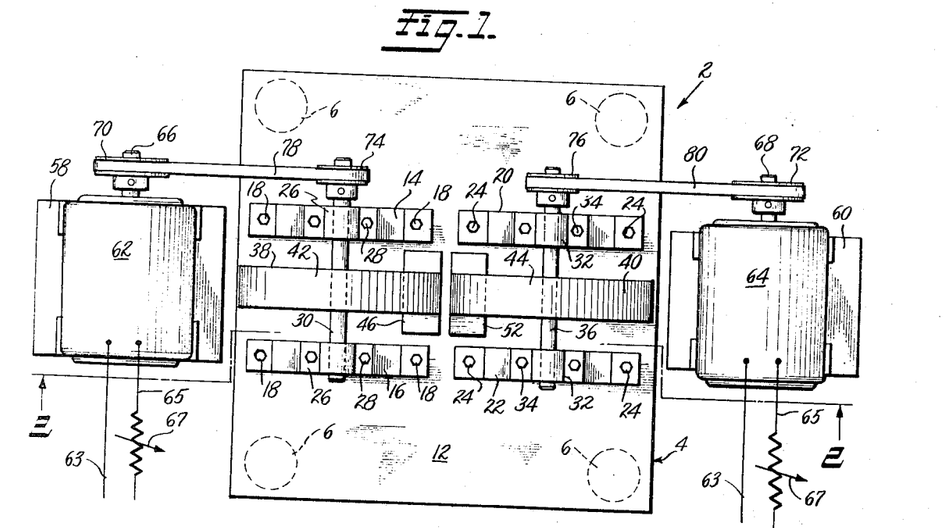
FIG. 1 is a plan view of a first embodiment of the vibrator apparatus of the invention, incorporating a pair of motor driven members provided with eccentrically mounted permanent magnets that function both as eccentric weights and as means to synchronize the oppositely rotating members on which they are carried.
Figures 2, 3:
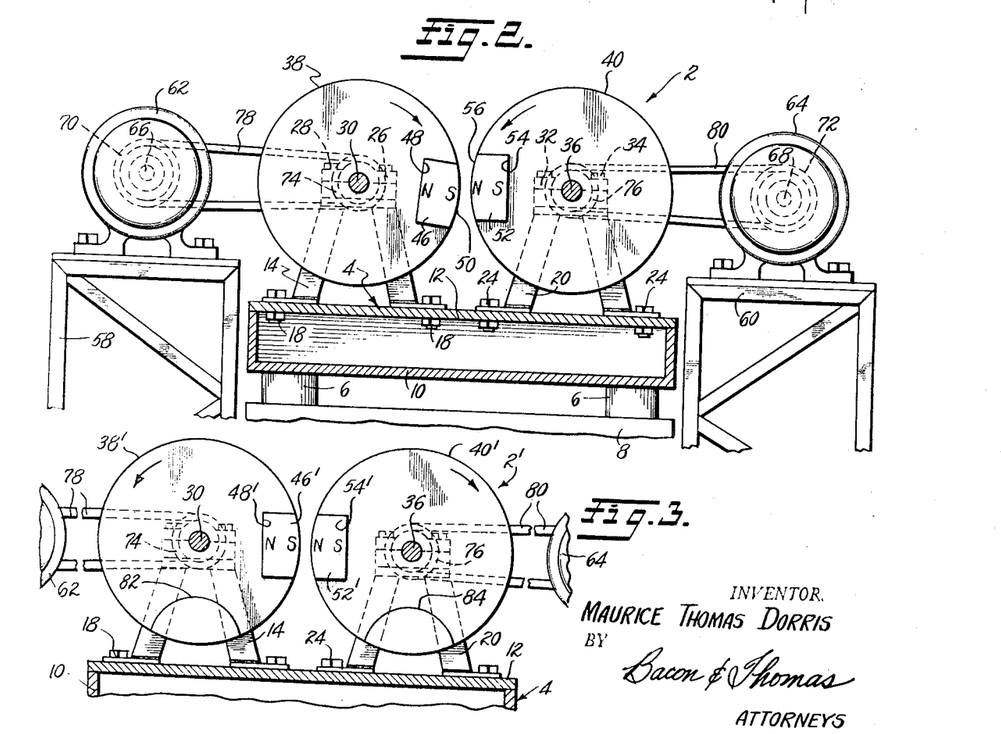
FIG. 2 is a vertical sectional view, taken on the line 2—2 of FIG. 1.
FIG. 3 is a fragmentary vertical sectional view, similar to FIG. 2, but illustrating a modified form of the apparatus wherein the permanent magnets on the oppositely rotating members are made separate from the eccentric weight means.

Referring now to FIGS. 1 and 2 of the drawings, a vibrator device is indicated at 2 and includes a rectangular platform 4 supported at each of its corners by legs 6 that are in engagement with a structure 8 to which vibrations are to be applied, the legs 6 being of any suitable construction for transmitting vibrations to the structure 8. The structure 8 can be a form for molding concrete or the like, a platform utilized for compacting earth, or some other structure, to which it is desired to impart vibrations, the specific nature thereof not being material to a description of the present invention.

The platform 4 includes a rectangular, box-like base 10 closed at its upper end by a square plate 12 secured thereon. A first pair of brackets 14 and 16 rests on the plate 12, the brackets being secured to the plate by bolts 18. Laterally aligned with the brackets 14 and 16 are brackets 20 and 22, respectively, secured to the plate 12 by bolts 24. The brackets 14 and 16 have aligned bearings 26 secured thereto by bolts 28. A horizontally disposed shaft 30 is rotatably supported in the bearings 26. Similarly, bearings 32 are secured to the brackets 20 and 22 by bolts 34, and a horizontally disposed shaft 36 extends therethrough. The shafts 30 and 36 are parallel, and lie in a common horizontal plane.

Secured to the shaft 30 centrally between the brackets 14 and 16 is a circular, metallic disc member 38, the shaft 30 passing through the center of said disc. A similar circular disc member 40 is secured to the shaft 36 midway between the brackets 20 and 22, the mass and diameters of the discs 38 and 40 being equal, and the peripheries 42 and 44, respectively, thereof, being slightly spaced apart.

A permanent bar magnet 46 is secured within a notch 48 in the disc 38, and projects laterally equal distances from the opposite sides of said disc. The outer surface 50 of the bar magnet 46 is arcuate and conforms with the peripheral surface 42 of the disc 38. A similar permanent bar magnet 52 is secured within a notch 54 in the disc 40, the outer surface 56 thereof being arcuate and coextensive with the peripheral surface 44 of the disc 40. The permanent bar magnets 46 and 52 are disposed so that the south pole of one magnet is positioned to confront the north pole of the other magnet, whereby when said magnets are in confronting position, a strong magnetic attraction field exists therebetween. Each magnet 46 and 52 has a weight substantially in excess of the weight of the metal that would be required to fill the notches 48 and 54 in the discs 38 and 40. Thus, the bar magnets 46 and 52 constitute substantial masses positioned eccentrically of their respective disc supporting shafts 30 and 36.

Positioned adjacent the structure 8, outwardly of the base 10, are motor support brackets 58 and 60, having substantially identical electric motors 62 and 64, respectively, mounted thereon. The motors 62 and 64 have output shafts 66 and 68 on which are secured pulleys 70 and 72, respectively, the pulleys 70 and 72 being respectively aligned with pulleys 74 and 76 secured on the shafts 30 and 36. The pulleys 70 and 74 are interconnected by a flexible belt 78, and the pulleys 72 and 76 are similarly interconnected by a flexible belt 80. The motors 62 and 64 are arranged so that when energized, they will rotate their associated discs 38 and 40 in opposite directions, as indicated by the arrows in FIG. 2. The motors 62 and 64 are adjustably mounted on the brackets 58 and 60 so that sufficient tension is maintained in the belts 78 and 80 to drive the members 38 and 40.

The vibrator apparatus 2 is designed to generate vibrations in an up and down or vertical direction. Such vibrations are produced when the discs 38 and 40 are simultaneously rotated in opposite directions, with the combined bar magnet and eccentric weights 46 and 52 being angularly arranged relative to each other so that as the discs 38 and 40 rotate, said weights attain 12 o'clock and 6 o'clock positions at the same instant to produce vertical vibrations. On the other hand, the inertia forces of the weights 46 and 52 cancel each other out when they are in the 3 o'clock and 9 o'clock positions. Vibrations only in a vertical direction thus result.

In operation, the motors 62 and 64 are energized by electrical current supplied though conductors 63 and 65 to rotate their associated eccentrically-weighted discs 38 and 40. It is a recognized fact that no two high-speed motors, even when new, will rotate at exactly the same r.p.m. and have exactly the same friction characteristics, field losses, etc. Accordingly, either or both of the motors 62 and 64 has a variable resistor 67 connected in the conductor 65 so that the speed of rotation of said motors and the discs 38 and 40 can be manually adjusted to be as nearly equal as possible. Assuming that the disc 38 is traveling slightly faster than the disc 40, there will be a short period during which the magnets 46 and 52 do not meet, so that the vibration effect slowly "shifts" circumferentially. Eventually, the magnets 46 and 52 will confront and come into close full proximity, as shown in FIG. 2, at which time the faster moving magnet 50 on the disc 38 literally pulls the slower moving magnet 54 on the disc 40 toward it. This pull eases the load on the motor 64 thereby allowing the disc 40 to speed up somewhat. The same magnetic pull increases the load on the motor 62 driving the disc 38 and thereby slows it down somewhat. In other words, the speed of one or the other of the motors 62 and 64 is initially adjusted while the discs 38 and 40 are being rotated. As the discs reach close synchronization, the faster moving magnet will pull the slower moving magnet toward it, to synchronize the speed of the two discs.

Thereafter, the magnetic attraction forces generated by the bar magnets 46 and 52 will function to synchronize the rotating discs 38 and 40 and to maintain said discs in a fixed relative angular relationship as they are rotated at identical speeds in opposite directions. With the discs 38 and 40 thus maintained magnetically synchronized, the combined bar magnet and eccentric weights 46 and 52 will attain 12 o'clock and 6 o'clock positions at the same instant, and vertical vibration impulses will be generated.

A modification of the vibrator apparatus of FIGS. 1 and 2 is shown at 2' in FIG. 3, wherein like elements bear the same reference numerals as in FIGS. 1 and 2. The vibrator apparatus 2' incorporates a pair of oppositely rotating discs 38' and 40' having notches 48' and 54' in the periphery thereof, respectively, within which strong permanent bar magnets 46' and 52' are secured.

The discs 38' and 40' differ from the discs 38 and 40 of FIGS. 1 and 2 in that they carry eccentrically-mounted weights 82 and 84, respectively, that are separate from the bar magnets 46' and 52'. The eccentric weights 82 and 84 are substantially wider than and are secured to their associated discs 38' and 40' at the periphery thereof. Also, they are radially spaced 90° from the bar magnets 46' and 52', but can be spaced on any other angle so long as the distance from the magnet to the weight is equal but opposite on each disc. The bar magnets 46' and 52' preferably have a mass equal to that of the metal required to fill the notches 48' and 54', whereby the weights 82 and 84 produce the vertical vibrations. The vibrator apparatus 2' is driven by the motors 62 and 64 and functions similarly to the vibrator apparatus 2 in FIGS. 1 and 2, with the bar magnets 46' and 52' being effective to synchronize the oppositely rotating discs 38' and 40' so that both eccentric weights 82 and 84 attain 12 o'clock and 6 o'clock positions at the same instant in time.

Figure 4:
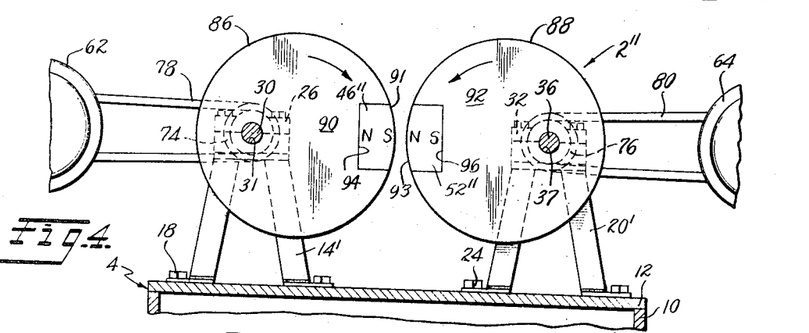
FIG. 4 is a fragmentary vertical sectional view similar to FIG. 2, but showing still another form of the apparatus incorporating eccentrically mounted, circular, rotating members equipped with permanent magnets for effecting synchronization thereof.

Another modification of the apparatus of FIGS. 1 and 2 is shown at 2" in FIG. 4, wherein like elements bear the same reference numerals as in FIGS. 1 and 2. In the apparatus of FIG. 4, circular disc members 86 and 88 are themselves eccentrically secured to the shafts 30 and 36, respectively. The shafts 30 and 36 pass through bores 31 and 37 in the discs 86 and 88, respectively, located about halfway between the center and the periphery of said discs. The shafts 30 and 36 are rotatable in bearings 26 and 32 mounted on brackets 14' and 20', respectively. With this arrangement, the outer mass portions 90 and 92 of the discs 86 and 88 are disposed diametrically opposite the bores 31 and 37, respectively, and constitute eccentric weights for generating vibrations. Vertical vibrations are produced when the centers of the oppositely rotating discs 86 and 88 are simultaneously disposed directly above and directly below their respective shafts 30 and 36.

The discs 86 and 88 have peripheral notches 94 and 96 disposed symmetrically about a line passing through the center of said discs and the bores 31 and 37. Secured within the notches 94 and 96 are strong permanent bar magnets 46" and 52", which function like the magnets 46 and 52 in FIGS. 1 and 2 to synchronize the rotating discs 86 and 88. The shafts 30 and 36 are so spaced that the peripheral surfaces 91 and 93 of the magnets 46" and 52" are close together when the discs 86 and 88 are rotated to the position shown in FIG. 4.

Another modification of the vibrator apparatus of FIGS. 1 and 2 is shown at 98 in FIGS. 5 to 8, wherein electromagnets are utilized instead of permanent bar magnets. The vibrator 98 of FIGS. 5 to 8 includes a pair of discs 100 and 102 secured to the shafts 30 and 36, respectively, to be rotated by the motors 62 and 64 as in FIG. 1, but not shown in FIGS. 5 to 8. The disc 100 has an eccentrically disposed weight 101 secured thereto at its periphery, and a similar eccentrically disposed weight 103 is secured to the disc 102. Both weights 101 and 103 are substantially wider than their associated discs 100 and 102.

Figures 5, 6, 7, 8:
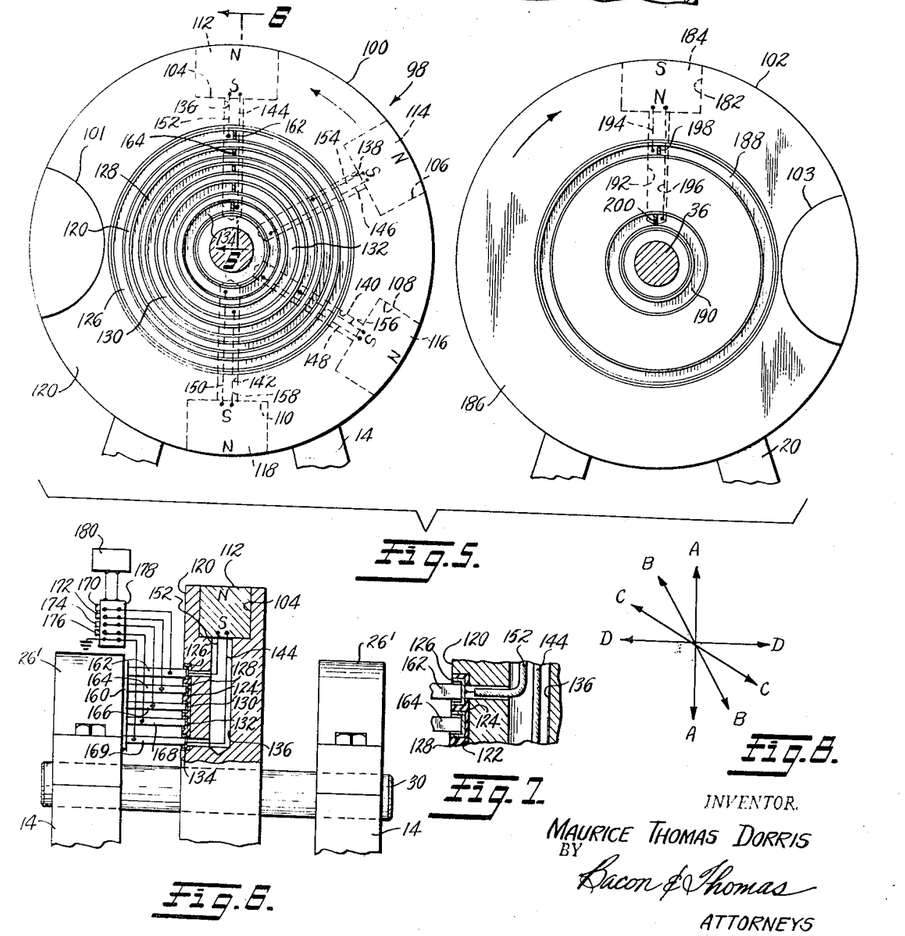
FIG. 5 is an enlarged vertical sectional view of still another form of motor driven vibrator device, embodying electromagnets to effect synchronization of the oppositely rotating members in different selective positions at will.
FIG. 6 is a fragmentary vertical sectional view, taken along the line 6—6 of FIG. 5.
FIG. 7 is an enlarged fragmentary sectional view of a portion of FIG. 6, particularly showing the contact means employed for transmitting electrical current to the electromagnet.
FIG. 8 is a force diagram illustrating the various directions of vibrations that can be applied with the apparatus of FIGS. 5–7, when different pairs of electromagnets are energized.
Figure 9:
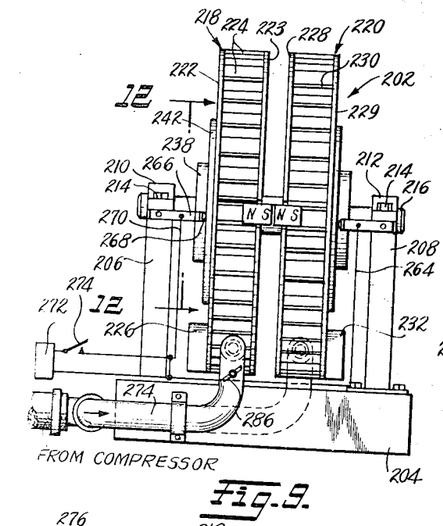
FIG. 9 is a front elevational view of another embodiment of the invention, incorporating a pair of turbine-like, oppositely rotating members mounted in side by side relationship on a horizontal shaft; and each carrying an electromagnet.

The disc 100 has four peripheral recesses 104, 106, 108 and 110 spaced 60° apart, the recesses 104 and 110 being disposed 180° apart, and being spaced 90° from the eccentric weight 101. Strong electromagnets 112, 114, 116 and 118 are secured in the recesses 104, 106, 108 and 110, respectively, all of said electromagnets being arranged with the same pole pointing radially outwardly. In FIG. 5, the "N" pole is shown outermost.

One radial face 120, FIG. 7, of the disc 100 has an annular depression 122 therein, within which is secured an annular disc 124 of insulating material having five concentrically arranged, channel-shaped metallic contact strips or tracks 126, 128, 130, 132 and 134 mounted thereon. The disc 100 has four radial bores 136, 138, 140 and 142 leading from the recesses 104, 106, 108 and 110, respectively, to the region of the innermost contact track 134. One terminal wire 144, 146, 148 and 150 from the electromagnets 112, 114, 116 and 118, respectively, extends through the associated bores 136, 138, 140 and 142, and is connected to the innermost contact track 134. The other lead wires 152, 154, 156 and 158 of the electromagnets 112, 114, 116 and 118 also extend through their respective bores 136, 138, 140 and 142, and are connected to the contact tracks 126, 128, 130 and 132, respectively.

Secured to the inner face of the bearing 26' that confronts the face 120 of the disc 100 is a contact base 160. Mounted on the base 160 are contact strips 162, 164, 166, 168 and 169, having their outer ends in sliding engagement with the contact tracks 126, 128, 130, 132 and 134, respectively. The contact strips 162, 164, 166 and 168 are connected by leads to individual switches 170, 172, 174 and 176 mounted in a switch unit 178, and the innermost contact strip 168 is connected by a lead through the switch unit 178 to ground. The switch unit 178 is supplied with electric current from a suitable power source 180. It is thus seen that by operating the switch 170, 172, 174 or 176, any selected one of the electromagnets 112, 114, 116 and 118 can be energized.

The disc 102, FIG. 5, has a peripheral recess 182 spaced 90° counterclockwise from the eccentric weight 103. An electromagnet 184 is secured within the recess 182, and is arranged so that its radially outermost pole "S" will be opposite the outermost pole "N" of the magnets 112, 114, 116 and 118. One face 186 of the disc 102 has a pair of insulated, concentrically arranged contact tracks 188 and 190 mounted thereon, which are similar to the contact tracks 126 to 134. A radial bore 192 extends from the recess 182 to the region of the innermost contact track 190, and lead wires 194 and 196 of the electromagnet 184 extend through the bore 192 and are connected with the contact tracks 188 and 190, respectively. Contact strips 198 and 200 similar to the contact strips 162 to 169 are mounted to slidingly engage within the contact tracks 188 and 190, respectively, and are connected to a source of electricity to continuously energize the electromagnet 184 while the vibrator apparatus 98 is in operation.

The strong electromagnets of the vibrator 98 function like the permanent magnets 46 and 52 in FIGS. 1 and 2 to maintain the oppositely rotating, eccentrically weighted disc members 100 and 102 in a desired relative angular position. An advantage of the vibrator 98 is that by energizing different ones of the electromagnets 112, 114, 116 and 118, the apparatus 98 can be synchronized to operate with the weights 101 and 103 in any one of four selective different relationships, whereby vibrations in any one of four different preselected directions can be obtained.

As has been stated, the electromagnet 184 is energized at all times while the vibrator 98 is in operation. If the switch 170 is operated to energize the electromagnet 112, while the other electromagnets 114, 116 and 118 remain unenergized, then the electromagnets 112 and 184 will cooperate to synchronize the vibrator 98 so that the eccentric weights 101 and 103 will simultaneously attain 12 o'clock and 6 o'clock positions as the discs 100 and 102 are rotated in opposite directions, thus producing vertical vibrations as indicated by the arrows, A, A, in FIG. 8.

If the switch 176 is operated to energize the electromagnet 118 while the electromagnets 112, 114 and 116 are unenergized, then the electromagnets 118 and 184 will cooperate to synchronize the oppositely rotating discs 100 and 102, the same as described hereinabove. With the magnets 118 and 184 energized, the discs 98 and 102 will be synchronized so that the eccentric weight 104 will arrive at a 3 o'clock and a 9 o'clock position at the same instant that the eccentric weight 106 arrives at a 9 o'clock and a 3 o'clock position, respectively. This results in the generation of horizontal vibrations, as indicated by the arrows D, D in FIG. 8.

By energizing the electromagnet 114, vibrations in the direction indicated by the arrows B, B in FIG. 8 can be obtained, and vibrations in the direction of the arrows C, C in FIG. 8 can be obtained by energizing the electromagnet 116. It is thus seen that the vibrator 98 can be operated to produce vibrations in any selected given direction, depending on the circumferential locations of the electromagnet 112, 114, 116 and 118 on the rotating disc 100. Further, a change from one direction of vibration to another direction of vibration can be made merely by switching from one electromagnet 112, 114, 116 or 118 to another while the apparatus 98 is operating. No gears, belts, chains or other mechanical elements need be adjusted to change from one direction of vibration to another, and with the magnetically synchronized apparatus 98 there is no need to stop rotation of the members 100 and 102 while a change in the mode of vibration is being made.

The embodiments of FIGS. 1 to 8 are all driven by electric motors and belts as aforedescribed, an arrangement satisfactory in most applications. However, there is a practical limit of about 3,000 or 4,000 r.p.m. on the speed at which the oppositely rotating members of a vibrator can be operated by a belt. Hence, another embodiment of the invention is shown in FIGS. 9 to 13, wherein the rotating members of a vibrator unit 202 are driven in a turbine-like manner, making possible the obtaining of very high rotational speeds and consequently very high frequency vibrations.

Referring to FIGS. 9 to 13, the vibrator 202 includes a base 204, which can be connected with any structure to which it is desired to impart vibrations. A pair of aligned brackets 206 and 208 is secured to the base 204, and have bearings 210 and 212, respectively, secured thereto by bolts 214. The opposite ends of a shaft 216 are journaled in the bearings 210 and 212, and rotatably mounted to the shaft in closely spaced, side-by-side relationship is a pair of circular disc members 218 and 220. The disc 218 comprises a pair of spaced circular plates 222 and 223, connected at their periphery by a plurality of circumferentially spaced, non-radial vanes 224. Secured to the plate 222 at the periphery thereof is a weight 226, which is thus disposed eccentrically of the shaft 214.

The disc 220 comprises a pair of spaced circular plates 228 and 229, connected at the periphery thereof by a plurality of circumferentially spaced, non-radial vanes 230, the vanes 230 being inclined in a direction opposite to the inclination of the vanes 224. Secured to the plate 229 near the periphery thereof is an eccentrically positioned weight 232.

Mounted upon the confronting radial plates 223 and 228 at the periphery thereof are strong electromagnets 234 and 236, respectively. The magnets 234 and 236 are spaced 90° from their associated weights 226 and 232, and are arranged so that they will be in confronting relationship when both of the weights 226 and 232 are in a 6 o'clock position. The magnets 234 and 236 are further arranged so that opposite poles (N to S) are in confronting relationship, whereby to create a magnetic attraction field therebetween when the magnets are energized in a confronting relationship.

Figure 12:
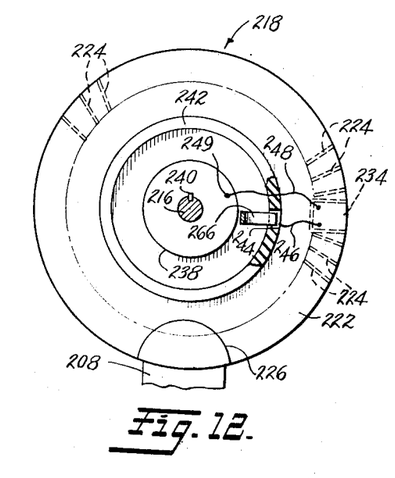
FIG. 12 is a vertical sectional view taken along the line 12—12 of FIG. 9.
Figure 13:
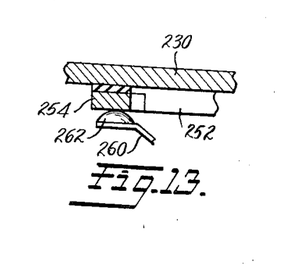
FIG. 13 is an enlarged sectional view taken along the line 13—13 in FIG. 10, showing the contact arrangement for transmitting electrical current to the electromagnet on one of the rotating members.

The outer face of the plate 222, FIG. 12, has a centrally positioned hub 238 thereon secured by a key 240 to rotate with the shaft 216. An annulus 242 of insulating material is secured concentrically on the outer surface of the plate 222, and has a short strip of conductive material 244 mounted thereon, and to which one lead 246 of the electromagnet 234 is connected. The other lead 248 of the electromagnet 234 is grounded to the hub 238 at 249.

Figure 10:
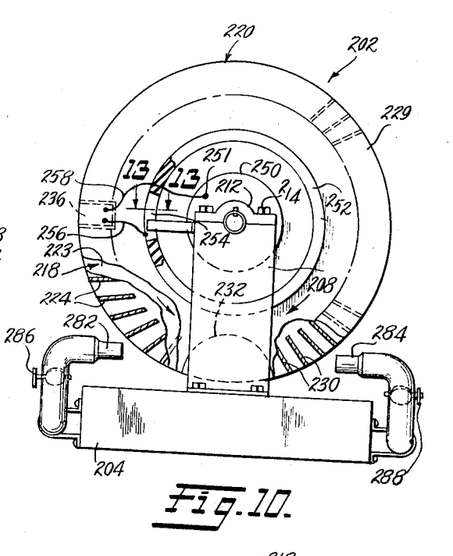
FIG. 10 is a side elevational view of the apparatus shown in FIG. 9 with portions partially broken away to better show the construction thereof.
Figure 11:
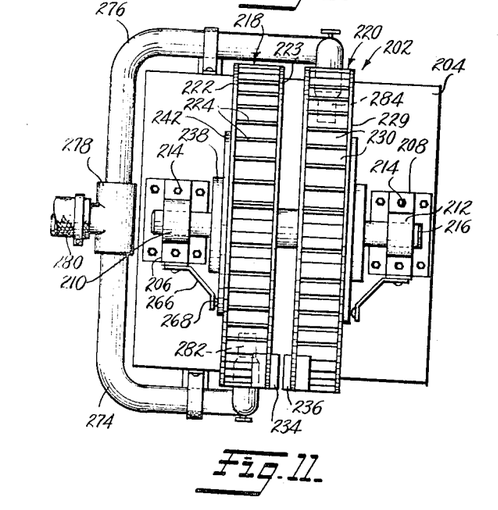
FIG. 11 is a plan view of the apparatus of FIG. 9.

The outer face of the plate 229 has a hub 250, FIG. 10. Disposed radially outwardly from the hub 250 is an annulus 252 of insulating material. A strip of conductive material 254 is secured to the insulating annulus 252, and has a length substantially longer than the contact strip 244. One lead 256 of the electromagnet 236 is connected to the conductive strip 254, and the other lead 258 of said electromagnet is grounded to the hub 250 at 251. Secured to the bracket 208 is a resilient contact arm 260, including a rounded contact surface 262 on the tip thereof (FIG. 13) which is positioned to ride on the annulus 252. Electric current is supplied to the contact arm 260 through a lead 264, and the electromagnet 236 is thus energized once during each revolution of the member 220 when the tip 262 of the contact arm 260 is in engagement with the conductive strip 254.

A contact arm 266, FIG. 8, identical in construction to the contact arm 200, is mounted on the bracket 206, and the tip 268 thereof rides on the annulus 242. Lead 270 conducts electric current to the contact arm 266, and thus the electromagnet 234 is energized once during each revolution of the member 218. Electric current is supplied to the leads 270 and 264 by a suitable power supply 272, through a switch 274.

The contact strips 244 and 254 are arranged on the members 218 and 220 so that the magnets 234 and 236 will be energized each time they come into confronting relationship during rotation of said members. The strong electromagnets 234 and 236 thus function to maintain the rotating members 218 and 220 in a synchronized relationship even though they are rotated in opposite directions, whereby the eccentrically positioned weights 226 and 232 will arrive simultaneously at 12 o'clock and 6 o'clock positions to generate vertical vibrations. Obviously, other arrangements for the electromagnets can be employed to produce vibrations in other selected directions, as taught in FIGS. 5 to 8.

Secured to the base 204 is a pair of conduits 274 and 276, which are connected through a T-fitting 278 to a supply conduit 280 leading from a source of compressed air, or other suitable turbine-driving medium. The conduit 274 extends partially around the base 204, and terminates in a nozzle 282 positioned to discharge tangentially against the vanes 224 of the disc 218. The other conduit 276 extends partially about the base 204, and terminates in a nozzle 284 disposed to discharge tangentially on the vanes 230 of the disc 220. The conduits 274 and 276 are equipped with valves 286 and 288, respectively, to control flow therethrough, so that identical discharge rates can be obtained from the nozzles 282 and 284 for driving the members 218 and 220 at identical speeds.

In operation, air pressure, or some other suitable medium, is supplied through the conduit 280 and issues from the nozzles 282 and 284 to impinge tangentially on the inclined vanes 224 and 230, respectively. The discs 218 and 220 are thus driven in opposite directions in a turbine-like manner, the speed of rotation being established by adjusting the valves 286 and 288 until the members rotate at almost identical speeds. The electromagnets 234 and 236 function to synchronize the rotating members as previously described, so that the eccentric weights 226 and 232 will be effective to produce vibrations in a vertical direction only. Any tendency for the discs 218 and 220 to deviate from synchronized relation is overcome by the strong electromagnets which can override either the air jet from the nozzles 282 or 284 to maintain the discs synchronized. The turbine-like members 218 and 220 can attain high rotational speeds on the order of 10,000 to 20,000 r.p.m., and thus the apparatus 202 is capable of producing very high frequency vibrations. Because synchronization of the oppositely rotating members is obtained by the electromagnets 234 and 236, rather than through mechanical linkage elements, friction heat, wear and mechanical failures normally associated with such high rotational speeds are minimized.

Figure 14:
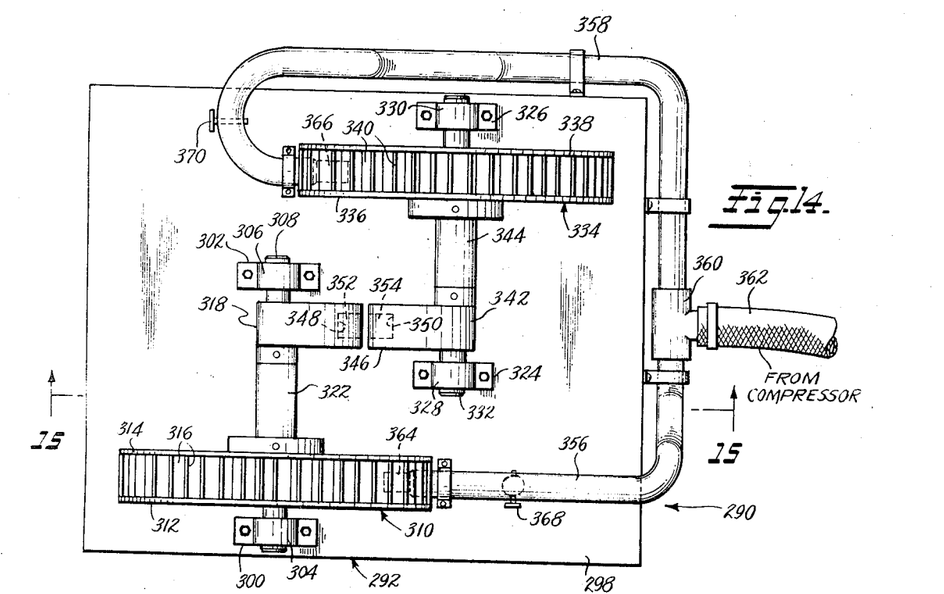
FIG. 14 is a plan view of another embodiment of the invention, incorporating a pair of eccentrically-weighted, turbine-like, oppositely rotating members mounted on parallel horizontal shafts and each carrying a permanent magnet.
Figure 15:
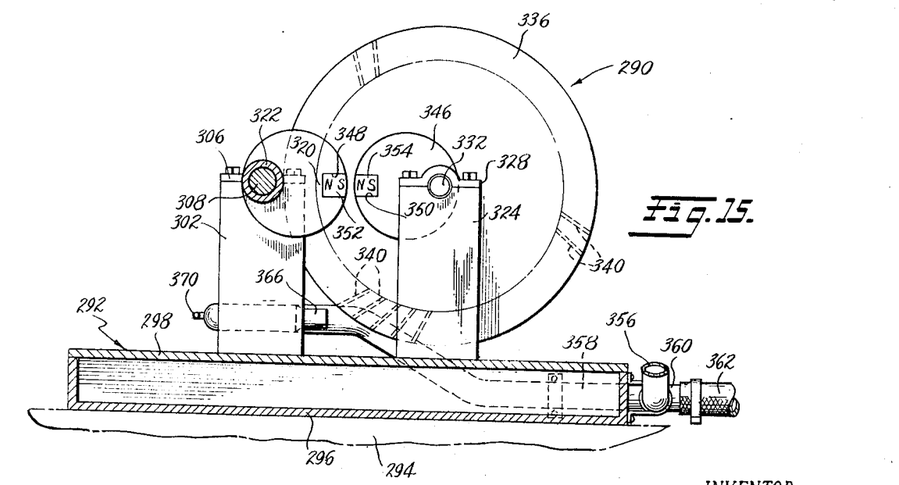
FIG. 15 is a vertical sectional view taken on the line 15—15 of FIG. 14.

A modification of the turbine-like vibrator apparatus 202 is shown at 290 in FIGS. 14 and 15, wherein the apparatus 290 includes a rectangular base 292, which can be connected with structure 294 to which it is desired to impart vibrations. The base 292 includes a rectangular box 296 closed by a rectangular plate 298, to which is secured a first pair of aligned brackets 300 and 302.

Mounted on the brackets 300 and 302 are bearings 304 and 306, within which the opposite ends of a shaft 308 are journaled. Secured to the shaft 308 adjacent the bracket 300 is a turbine wheel 310, including a pair of circular plates 312 and 314 connected at the periphery thereof by a plurality of circumferentially spaced, non-radial vanes 316.

Eccentrically mounted on the shaft 308 adjacent the bracket 302 is a circular disc member 318. A portion 320 of the member 318 is disposed diametrically opposite the shaft 308 defining an eccentric weight similar to the arrangement in FIG. 4. A collar 322 is positioned between the disc 310 and the member 318, and maintains the spacing therebetween.

A second pair of brackets 324 and 326 is secured to the plate 298 and extends parallel to the shaft 308. Bearings 328 and 330 are mounted on the brackets 324 and 326, and support the opposite ends of a shaft 332. Secured to the shaft 332 adjacent the bracket 26 is a turbine wheel 334, comprising a pair of circular plates 336 and 338 connected at the periphery thereof by a plurality of circumferentially spaced, non-radial vanes 340. A member 342, identical to the member 318, is eccentrically mounted on the shaft 332 to be in alignment with the member 318, and a collar 344 maintains the spacing between the member 342 and the disc 334. The member 342 includes an eccentric weight portion 346. The eccentric weight portions 320 and 346 have recesses 348 and 350, respectively, in the periphery thereof disposed symmetrically about a horizontal plane passing through the centers of the members 342 and 318 and the shafts 308 and 322. Strong permanent magnets 352 and 354 are secured in the notches 348 and 350, respectively, with opposite poles thereof in confronting relation.

Conduits 356 and 358 are secured to the base 292, and are connected by a T-fitting 360 to a conduit 362 for supplying compressed air, or some other suitable medium for driving the turbine wheels 310 and 334. The conduit 356 terminates in a nozzle 364 arranged to discharge tangentially on the vanes 340 of the turbine wheel 310, and the conduit 358 terminates in a nozzle 366 which is arranged to discharge tangentially on the vanes 340. The conduits 356 and 358 are equipped with valves 368 and 370, respectively, for controlling flow therethrough, whereby the speed of the turbine wheels 310 and 334 can be made adjustable.

In operation, the turbine wheels 310 and 334 are caused to rotate in opposite directions, thereby effecting similar rotation of the members 318 and 332. High frequency vibrations are produced when the eccentric weight portions 320 and 346 of the members 318 and 342 simultaneously attain 12 o'clock and 6 o'clock positions, the permanent magnets 352 and 354 functioning to maintain synchronization of the members 318 and 342 to produce vertical vibrations.

Figure 16:
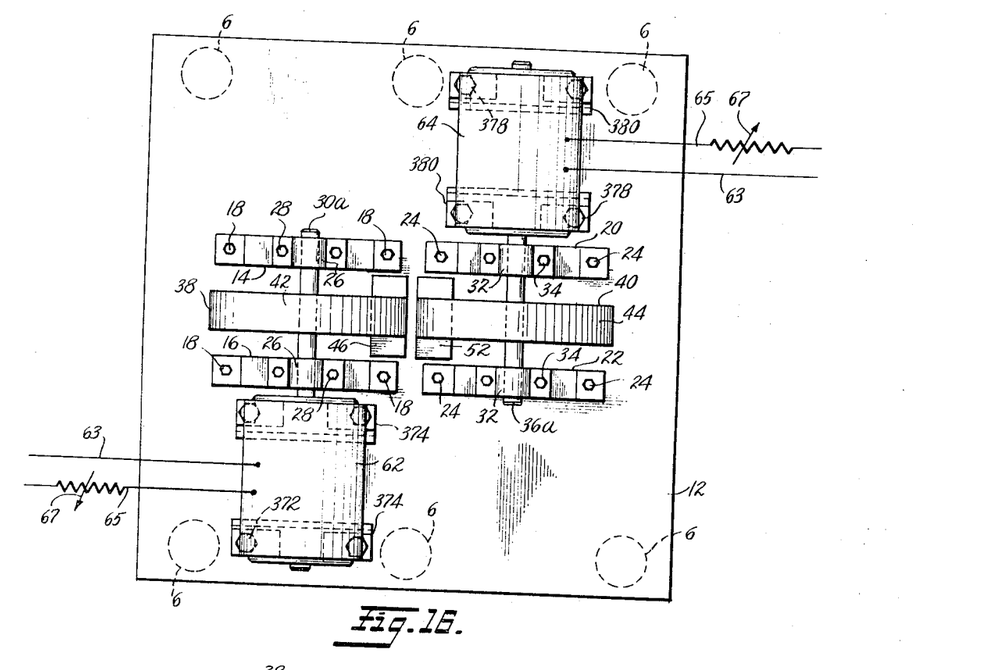
FIGS. 16 and 17 illustrate a further embodiment of the invention wherein the eccentrically-weighted rotary members are driven by electric motors mounted coaxially with said members.
Figure 17:
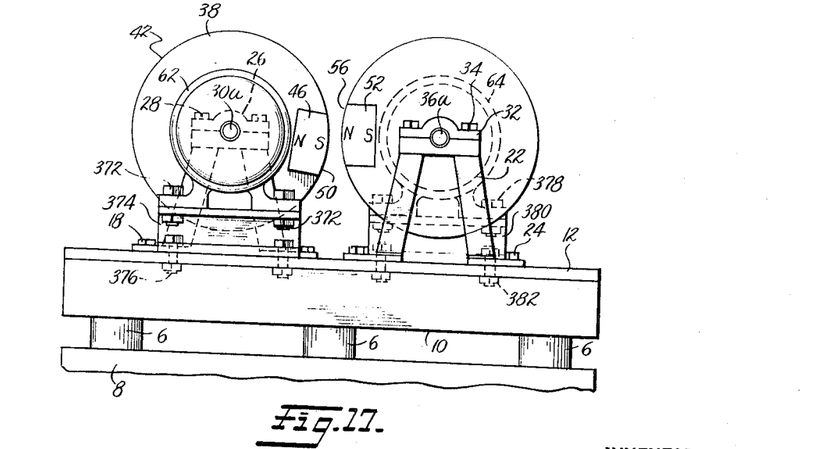

FIGS. 16 and 17 illustrate a further embodiment of the invention, wherein the like elements bear the same reference numerals as in FIGS. 1 and 2. FIGS. 16 and 17 show a simplified structure wherein the motor supports 58 and 60, and the belt and pulley drives 70, 74, 78, and 72, 76 and 80 have been eliminated, and the discs 38 and 40 have been mounted on shafts 30a and 36a coaxial with the axis of the motors 62 and 64, respectively. The motors 62 and 64 may be secured to the base 10 in any suitable manner, but for illustrative purposes, the motor 62 is shown secured by bolts 372 to channel sections 374, which are fastened by bolts 376 to the base 10. Similarly, the motor 64 is secured by bolts 378 to channel sections 380 fastened by bolts 382 to the base 10.

The vibrator of FIGS. 16 and 17, with its direct motor drive of the discs 38 and 40 carrying the permanent magnets 46 and 52, respectively, is synchronized and functions in the same manner explained in connection with FIGS. 1 and 2.

Obviously, many modifications and variations of the present invention are possible in the light of the foregoing teachings. For example, the eccentrically-weighted members of FIGS. 3, 4 and 5 could be coaxially mounted with the shaft of respective driving motors. It is, therefore, to be understood that within the scope of the appended claims the invention may be practiced otherwise than as specifically illustrated and described.

I claim:

1. Apparatus for producing vibrations, comprising: a base; a pair of rotor members mounted on said base in closely spaced relationship; eccentric weight means rotatable with each of said rotor members; means for separately rotating said rotor members; and synchronizing means effective to synchronize said rotor members while they are rotating, so that the eccentric weight means on one of said rotor members is held in a preselected relationship relative to the eccentric weight means on the other of said rotor members, said synchronizing means comprising: first magnet means carried on and rotatable with one of said rotor members along a first circular path of travel, and arranged to confront the other rotor member at least momentarily while being rotated along said first path; and second magnet means carried on and rotatable with the other rotor member along a second circular path of travel, and arranged to confront said first path of travel at least momentarily while being rotated along said second path.

2. Apparatus as recited in claim 1, wherein said first and said second magnet means comprise permanent magnets secured to said rotor members.

3. Apparatus as recited in claim 2, wherein said permanent magnets are incorporated into said eccentric weight means.

4. Apparatus as recited in claim 1, wherein said first and said second magnet means comprise electromagnets.

5. Apparatus as recited in claim 1, wherein said second magnet means comprises a plurality of selectively operable electromagnets circumferentially spaced about said second path, and means for selectively operating said plurality of electromagnets, whereby the relative fixed relationship between the eccentric weight means on said first rotor member and the eccentric weight means on said second rotor member can be changed by selectively actuating different ones of said electromagnets.

6. Apparatus as recited in claim 1, wherein said means for separately rotating said rotor members comprises a pair of motors, one motor being connected with each rotor member.

7. Apparatus as recited in claim 1, wherein said means for separately rotating said rotor members comprises turbine apparatus associated with each rotor member.

8. Apparatus as recited in claim 1, wherein each of said rotor members has an array of vanes thereon, and wherein said means for rotating said rotor members comprises apparatus for directing a jet stream on each of said vane arrays.

9. Apparatus as recited in claim 1, wherein the means for separately rotating the rotor members comprises a pair of motors, one motor being axially aligned with and drivingly connected with each rotor member, and wherein at least one of the motors has a variable resistor connected in circuit therewith to adjust the speed thereof.

10. Apparatus for producing vibrations, comprising: a base; a pair of rotor members mounted on said base in side-by-side, closely spaced relationship, and arranged for rotation in opposite directions about a common axis; eccentric weight means on each of said rotor members; means for separately rotating said rotor members in opposite directions; and synchronizing means effective to synchronize said rotor members while they are rotating, so that the eccentric weight means on one of said rotor members is held in a preselected relationship relative to the eccentric weight means on the other of said rotor members, said synchronizing means comprising: first magnet means on one of said rotor members, spaced radially from said common axis and arranged to confront the other rotor member; and second magnet means on the other rotor member, arranged to confront said one rotor member and spaced radially from said common axis substantially the same distance as said first magnet means.

11. Apparatus as recited in claim 10, wherein said first and said second magnet means each comprises an electromagnet.

12. Apparatus as recited in claim 10, wherein said first magnet means comprises a single electromagnet, and wherein said second magnet means comprises a single electromagnet and means for simultaneously actuating said electromagnets while in confronting relationship with each other.

13. Apparatus for producing vibrations, comprising: a base; a pair of spaced, parallel shafts mounted on said base; a pair of rotor members each including eccentric weight means, one of said rotor members being mounted on each of said shafts, said rotor members lying in a common plane and being arranged in closely spaced peripheral relationship; means operable for separately rotating said rotor members in opposite directions; and synchronizing means effective to synchronize said rotor members while they are rotating, so that the eccentric weight means of one of said rotor members is held in a preselected relationship relative to the eccentric weight means of the other of said rotor members, said synchronizing means comprising: first magnet means mounted at the periphery of one of said rotor members; and second magnet means mounted at the periphery of the other of said rotor members.

14. Apparatus as recited in claim 13, wherein said first and said second magnet means comprise permanent magnets.

15. Apparatus as recited in claim 13, wherein said first magnet means comprise an electromagnet, and wherein said second magnet means includes at least one electromagnet.

16. Apparatus as recited in claim 15, wherein said second magnet means includes a plurality of circumferentially spaced individually and selectively operable electromagnets.

17. In an apparatus incorporating a pair of closely spaced, independently driven oppositely rotating members, means for synchronizing said rotating members, comprising: first magnet means on one of said members, arranged to follow a first circular path; and second magnet means on the other of said members, arranged to follow a second circular path that confronts at least a portion of said first circular path, said first and said second magnet means being arranged to create a magnetic attraction field therebetween when in confronting relationship.

References Cited

UNITED STATES PATENTS

| | | |
|---|---|---|
| 2,635,483 | 4/1953 | Welsh. |
| 2,681,419 | 6/1954 | Sherwen ___________ 209—368 |
| 3,091,712 | 5/1963 | Galbraith ___________ 74—61 |

FOREIGN PATENTS 761,498  11/1956  United Kingdom.

FRED C. MATTERN, JR., *Primary Examiner.*

W. S. RATLIFF, JR., *Assistant Examiner.*

U.S. Cl. X.R.

198—220; 209—366.5